W. M. CARR.
PROCESS OF INCINERATING GARBAGE AND APPARATUS THEREFOR.
APPLICATION FILED DEC. 11, 1911.
1,134,512.
Patented Apr. 6, 1915.
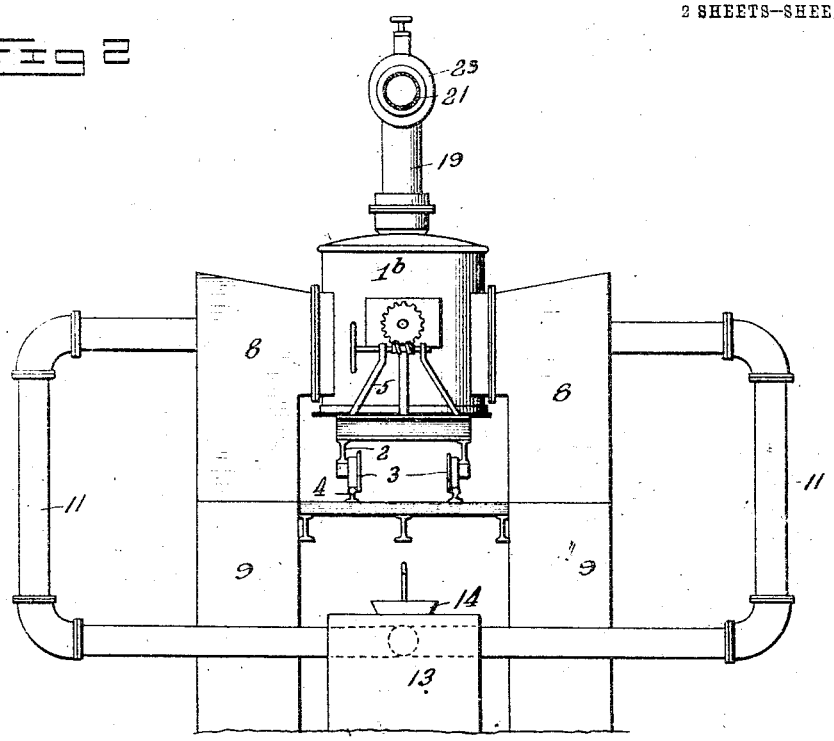
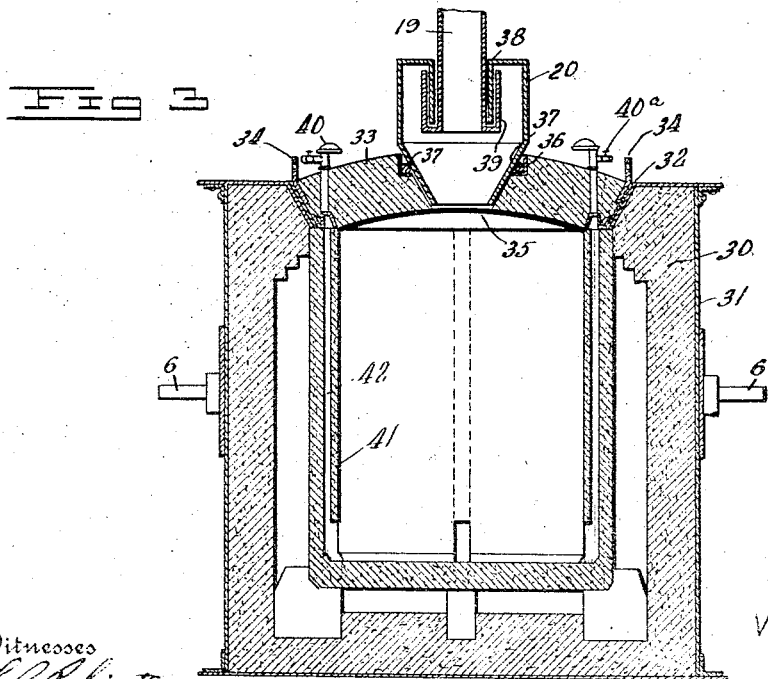

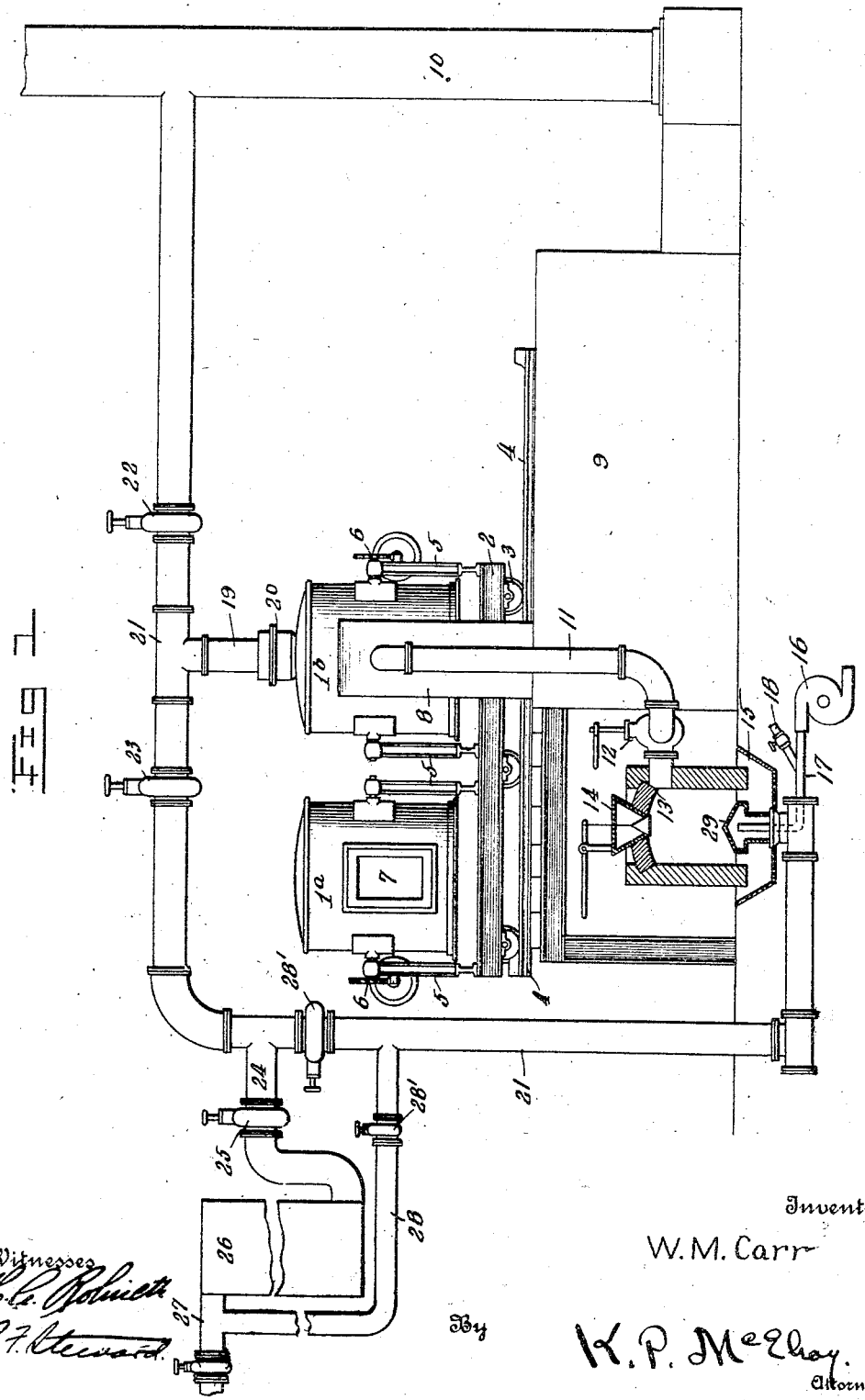

UNITED STATES PATENT OFFICE.

WILLIAM M. CARR, OF WHEELING, WEST VIRGINIA.

PROCESS OF INCINERATING GARBAGE AND APPARATUS THEREFOR.

1,134,512.   Specification of Letters Patent.   Patented Apr. 6, 1915.

Application filed December 11, 1911. Serial No. 664,949.

*To all whom it may concern:*

Be it known that I, WILLIAM M. CARR, a citizen of the United States, residing at Wheeling, in the county of Ohio and State of West Virginia, have invented certain new and useful Improvements in Processes of Incinerating Garbage and Apparatus Therefor, of which the following is a specification.

This invention relates to processes of incinerating garbage and apparatus therefor; and it comprises a method of incinerating and gasifying garbage, sludges and like waste organic materials with recovery of valuable by-products wherein such material is heated, charred and treated in a succession of closed containers or retorts successively brought into engagement with regeneratively heated firing means until the contents are carbonized, the residual carbonized material is allowed to cool within such containers to a sufficient degree and is finally gasified by semi-combustion within a producer furnishing gas to such regeneratively heated firing means, vapors and gases evolved in the treatment of material in such containers being also supplied to said producer; and it also comprises an apparatus for incinerating garbage, making coke and like purposes comprising as an organization of apparatus elements a transportable removable retort or container, stationary gas removing means adapted for engagement with such retort, regeneratively supplied firing means adapted to heat such retort and a gas producer feeding such firing means and having suitable connections for returning gases or vapors from such retort through the fuel mass in said producer; all as more fully hereinafter set forth and as claimed.

Incineration of garbage and similar more or less wet wastes is the most thorough, safe and sanitary way of disposing of the same, but it offers many difficulties in the usual manner of operation, partly because of the constantly varying nature of the material and partly because of its wet character. As city garbage averages, it has ordinarily enough fuel value to dispose of the contained water but particular canfuls, or a succession of canfuls may be much wetter than the general average. And in any event, the supply of a portion of wet garbage to any form of incinerating apparatus results in the temporary evolution of a large volume of steam carrying with it offensive vapors, which may, and usually do, create a nuisance. It is practically impossible to supply wet garbage directly to any form of incinerating chamber without this evolution of offensive vapors. And as stated, it often happens that temporarily the amount of combustible materials in the garbage supplied during a given time interval will not be sufficient to take care of the evaporation of the moisture. And where the garbage is continuously supplied to an incinerating chamber this necessitates during such intervals the supply of other fuel.

Garbage usually contains both animal and vegetable matter together with a constantly varying amount of water. Upon heating, it first loses a large volume of water by evaporation, giving foul smelling vapors. Next it carbonizes, giving off combustible gas and ammonia and leaving a residue of charcoal. This charcoal or carbon finally burns, giving a residue of ash.

In the present invention I have devised a method of operation particularly adapted to garbage, sludge and the like, although useful in other relations in the charring and disposition of organic matter. In handling garbage under the present invention instead of continuously performing the operations of drying, carbonizing and incineration upon a given portion of material, I separate the operations and I am thereby enabled to average out the fluctuations in the character of the material, the excess of char accumulating in periods of high-value garbage serving to furnish heat in periods where wetter garbage is being supplied. To this end, in the present process I place the garbage or the like in a plurality of containers which are successively brought into heating relationship with regeneratively supplied firing means. During the period of engagement, the container or retort is also in engagement with means for removing gas and vapor. The container or retort may be, and advantageously is, provided with means for admitting more or less air during the heating operation to prevent caking of the contents and to hasten the action. The regenerative firing means are supplied by a gas producer operating on charred residues of a prior operation. During the first period of heating, the evolution of steam is always copious and this steam is led to the gas producer and employed as an endothermic body, aiding in supplying gas to be burnt in the heating chamber. In so doing, of course noxious vapors are effectively destroyed. As the evolution of steam ceases that of combustible distillation gases begins and these gases may also be led through the producer, supplementing or replacing for a time the gas generated therein, and burnt in the firing chamber. As garbage and the like are usually relatively rich in nitrogen, the distillation gases at one period usually contain considerable amounts of ammonia, the nitrogen of the garbage in part coming off as ammonia gas. During this period instead of leading the vapors and gases directly to the producer, the current of distillation gas may be by-passed through suitable scrubbers and the like to regain this ammonia, which forms a valuable by-product. After scrubbing, the gas may then go to the producer. In dealing with relatively dry garbage, sludge and the like, where more gas is evolved than is necessary for heating the excess may of course be led off to another point of use. After the current of distillation gases slackens the container may be removed from the firing means and replaced by another containing fresh garbage. The removed container may be allowed to stand and cool until danger of ignition of the charred residue is over, dumped and refilled. The char is sent to the gas producer; or as much of it as may be necessary. With wet garbage and sludge it may all be required and, in extreme cases, other fuel, such as coal, may be needed to supplement it. Where the supply of char is insufficient of course natural gas, oil or other fuel may be used to supplement the gas from the producer.

The containers or retorts may be successively placed in a firing chamber by crane means or the like; or, and advantageously each retort may be contained in an individual fire chamber provided with opposite ports for engagement with regenerator ports. This assemblage of retort and casing may be tiltably mounted (for convenience in dumping) on a truck and wheeled into and out of position between the regenerator ports. There may be a train of such trucks successively passing between such ports.

The regenerator is operated in the usual manner, flame alternately sweeping from each side through the fire chamber with the products of combustion serving to heat up checkers which in turn impart their heat to air for supplying such flame in the next pass. Gas from the producer serves as fuel for the regenerator.

The operation of the gas producer is more or less in phase with the operation of the retorts. During the period of free evolution of steam, it supplies water-gas to the regenerator and during the evolution of distillation gases it operates more or less as a mere fixer for such gas. At other times it acts as an ordinary producer and during such periods it usually stores up more or less heat which becomes available in the water-gas period. It is desirable to have a draft current of air flowing through the producer at all times so that in the period of evolution of steam the gas may be semi-water gas. It often happens that there is so free a flow of steam that the producer may become chilled if operated without air.

As will be obvious, in the above-described operation no opportunity is allowed for the escape of noxious gases or vapors and while in substance the garbage is furnishing fuel for its own evaporation and combustion yet since the evaporation and charring are separated in point of time from the final combustion in the producer temporary irregularities in composition of the garbage may be averaged out.

In the accompanying illustrations, I have shown, more or less diagrammatically, certain apparatus and organization of apparatus elements falling within the purview of the present invention and adapted for use in the described process.

In this showing: Figure 1 is a side view, mainly in elevation but with certain parts in section, of a complete apparatus; Fig. 2 is an end view, in elevation, of the same; and Fig. 3 is a view in vertical section, on an enlarged scale, of a suitable combined container and fire chamber.

In the showing of Fig. 1, reference numerals $1^a$ and $1^b$ respectively designate two of a succession of combined retorts and fire chambers. These are shown mounted on a common truck 2, run on wheels 3 and track 4. Each of these elements is mounted on standards 5 provided with means 6 for tilting the fire chamber and retort. As shown, element $1^b$ is in operative position, while $1^a$ is waiting its turn for engagement. Both these elements are provided with side firing ports 7, that on $1^b$ being concealed by the regenerator up-take 8 with which it is in engagement. 9 is a regenerator checker of ordinary construction communicating with stack 10.

For simplicity of illustration, the usual reversing valves, air ports, and the like, are not shown.

Gas is supplied to the firing chamber by conduit 11, valved at 12 and leading from a gas producer 13 provided with the usual charging bell 14, and water seal 15. Air is introduced by fan 16, through conduit 17, which may have an accessory valved steam connection 18. Steam and gas are led from the retorts or containers by means of conduit 19, provided with water seal 20 (see Fig. 3) and enter main 21. This main has a communication valved at 22 with the stack. The main is also valved at 23, and beyond this point leads a gas conduit 24, valved at 25, leading to a diagrammatically shown scrubbing device 26. Gas from the scrubber may be led to another point of use through valved pipe 27, while another conduit 28 returns scrubbed gases, freed from ammonia, to the main beyond valve 28'. This main has an upward prolongation 29 into the base of the gas producer.

The showing in Fig. 2 is the same, but is at right angles to the showing of Fig. 1, and consequently shows the duplication of elements necessary for regenerative firing.

Fig. 3 is a detail view, in section, of the combined fire chamber and retort or container of Figs. 1 and 2. As shown, it comprises a fire chamber 30 of refractory material, strengthened and supported by a steel shell 31. At the top, it is provided with a coned opening 32 within which rests a cap 33 of refractory material provided with hooks or rings 34, enabling handling by a crane when so desired. Centrally it is provided with a tapered opening of relatively small diameter 35, having an off-set 36, within which rests a gasket rope 37 of asbestos or the like. The water sealing device rests within this coned opening. It is provided at its top with a depending wall 38 within a water sealing recess formed by an upturned prolongation 39 of the conduit for taking away gases and vapors from the retort. The cap 33 is further provided with air inlet conduits 40 which may be check-valved if so desired and way be provided with air inlets 40$_a$. Below this cap and within the fire chamber is suitably supported the garbage container or retort 41. As shown, it is made of refractory material such as clay, gray iron, steel or other refractory material, and has passing downward along its walls air conduits 42 communicating at one end with the air conduits through the cap and at the other end with the interior of the retort or container. Where the container is of comparatively light iron or steel so as to be portable it may of course be used as a collecting receptacle in house-to-house collection, thereby saving transfer of garbage. But ordinarily it is better to have special retorts or containers such as shown instead of using simple collecting "cans."

The operation of this device is obvious from the foregoing. In use, the retort within the fire chamber 1$^a$ is filled with garbage and cap 33 placed in position. The garbage in 1$^b$ being finished, the truck 2 is pulled forward the necessary distance to bring firing ports 7 of 1$^a$ in register with the up-takes 8 from the regenerators 9. Gas from producer 13 passes through 11 and meets the hot air coming upward through 8 to produce a flame which streams across the fire chamber, heating up the retort or container. As will be understood, from time to time the regenerator elements are reversed so that flames stream alternately across the fire chamber from each side. The garbage in the container gives off at first a copious evolution of steam, which, if not ill-smelling, may be in part diverted to the stack by opening valve 22. The residue of the steam, or all of it, as the case may be, passes through conduit 21, valve 23 being open and valve 25 being closed, downward into the base of the producer. The producer, which is hot and which has been heated from the flow of air from 16, converts this steam into water gas which passes through gas conduit 11 to the firing chamber. If the introduction of air from 16 is continued through the water gas period, as it usually is, the gas produced is of course semi-water gas; *i. e.*, is a mixture of producer gas and water gas. The length of time during which this evolution of steam continues with the result of forming water gas is of course dependent on the amount of water in the material under treatment. After the evolution of steam ceases or diminishes sufficiently, the evolution of combustible gas begins. With much garbage this combustible gas carries with it ammonia in quantities worth while recovering. In such an event, valve 28' may be closed, valve 25 opened, and the combustible gas led through scrubbing element 26 for the recovery of ammonia. Any excess of the scrubbed gas which may be desired elsewhere is led off through 27. At certain periods in the evolution of distillation gases, the gas is quite rich. The remainder of the gas, or all of it, coming from the scrubber is introduced through pipe 28 into conduit 21, whence it passes into the producer. Often the amount of this combustible gas is sufficient to run the apparatus through the period of its evolution and in such an event it simply passes up through the producer and thence to the firing chamber during the time its evolution is copious. During this time, the flow of air may cease. When the evolution of distillation gas ceases or diminishes sufficiently, the water sealing device 20 is lifted sufficiently to clear the top 33 and the fire chamber and retort moved out of the way, orifice 35 being closed by a suitable cap or closure. The material in the retort is allowed to cool sufficiently to prevent its taking fire and is then dumped for subsequent use in the gas producer or elsewhere. As the retort containing the finished charge is removed, another is wheeled into place and the water sealing device 20 dropped to make engagement with the orifice 35 in its cap and the operation repeated.

Where garbage has been previously decreased by treatment with solvents and the like, it is usually sufficiently dry and there is but a small evolution of steam in the first heating stage and the use of the heat is therefore mainly for carbonization. With such material, an excess of gas may be given in the process, both in the distilling stage and in the gas producer stage and this excess may be otherwise utilized.

The apparatus in the present invention may of course be employed for gasifying and in treating other materials, as in making coke from coal, charcoal from wood, sawdust, and the like, etc.

The regenerative heating, while it may sometimes be dispensed with and particularly in the case of relatively dry garbage, is very advantageous as giving a greater economy of heat and therefore contributing to the attaining of the main object sought: the drying and incineration of the garbage by its own combustible elements.

In some cases, the amount of air admitted through 40 to the interior of the container or retort is sufficient to effect a more or less complete combustion of the carbonizing material in such retort. The gases thereby formed join the other gases going through main 21. Where element 40 is provided, as is usually the case, with an inwardly opening check-valve, emission of foul-smelling gases is prevented during temporary increases of internal pressure while normally the producer draft draws in a regulable amount of air. Air from a suitable source of air under pressure may be introduced through side inlet $40_a$.

What I claim is:—

1. In the treatment of garbage, the process which comprises heating garbage in a closed receptacle to dry and distil it and to furnish a carbonized residue, gasifying the carbonized residue and burning the resulting gas in heating relationship to fresh garbage to dry and distil the same.

2. In the treatment of garbage, the process which comprises heating garbage in a closed receptacle to dry and distil it and to furnish a carbonized residue, gasifying the carbonized residue with the aid of steam evolved in the heating stage and burning the resulting gas in heating relationship to fresh garbage to dry and distil the same.

3. In the treatment of garbage, the process which comprises heating garbage in a closed receptacle to dry and distil it and to furnish a carbonized residue, gasifying the carbonized residue with the aid of steam evolved in the heating stage and burning the resulting gas in heating relationship to fresh garbage to dry and distil the same, gas resulting from the distillation being returned for admixture with gas formed in such gasifying operation.

4. In the treatment of garbage, the process which comprises drying garbage to furnish steam, passing the steam through a gas producer to furnish water gas and burning the water gas in heat-transmitting relationship to said garbage.

5. In the treatment of garbage, the process which comprises drying and heating garbage to furnish steam and combustible gas, passing the steam and gas through a producer and burning the gas from the producer in heat-transmitting relationship to said garbage.

6. In the treatment of garbage, the process which comprises drying and heating garbage to furnish steam and combustible gas, passing the steam and gas through a producer and burning the gas from the producer in heat-transmitting relationship to said garbage, carbonized garbage resulting from the heating treatment being supplied to said producer.

7. In the treatment of wet waste materials, the process which comprises heating said material in a closed receptacle by gas firing until it is dried and carbonized, transmitting the resultant steam and gases through a gas producer containing the carbonized material to furnish gas and burning such gas in heating relationship to said receptacle.

8. In the treatment of wet waste materials, the process which comprises placing such material in a plurality of transportable containers, positioning such containers successively in heating relationship to a gas-fired regeneratively operating device until the contents of the container are dried and carbonized, transferring the carbonized residues to a gas producer, transmitting air and the steam and gases resulting from the drying and carbonizing through such residues to furnish combustible gas and burning such gas in such device to furnish heat for such drying and carbonizing.

9. In the treatment of wet waste materials, the process which comprises placing such material in a plurality of transportable containers, positioning such containers successively in heating relationship to a gas-fired regeneratively operating device until the contents of the container are dried and carbonized, transferring the carbonized residues to a gas producer, transmitting air and the steam and gases resulting from the drying and carbonizing through such residues to furnish combustible gas and burning such gas in such device to furnish heat for such drying and carbonizing, the gases from the carbonizing being scrubbed to remove and recover ammonia prior to transmitting to the gas producer.

10. In the treatment of wet waste material, the process which comprises drying and carbonizing such material in a closed receptacle by the aid of heat derived from the combustion of gas produced in the carbonizing operation and the combustion of gas produced by the semi-combustion of the carbonized residues in a structurally separate element 11. In the treatment of wet waste material, the process which comprises drying and carbonizing such material in a closed receptacle by the aid of heat derived from the combustion of gas produced in the carbonizing operation and the combustion of gas produced by the semi-combustion of the carbonized residues in a structurally separate element, some air being introduced into said closed receptacle during the carbonizing to produce partial combustion and aid in the heating of its contents.

12. In the treatment of garbage, the process which comprises supplying garbage to each of a succession of closed retorts contained in individual fire chambers, moving each such chamber successively into flame receiving relationship to a pair of gas fired regenerative devices, supplying and operating a gas producer with the aid of carbonized residues from such retorts, transmitting the steam and gases successively produced in each such retort through the producer to aid in producing gas and supplying the gas to such devices to produce the heat therein.

13. In the treatment of garbage, the process which comprises supplying garbage to each of a succession of closed retorts contained in individual fire chambers, moving each to a pair of gas fired regenerative devices, supplying and operating a gas producer with the aid of carbonized residues from such retorts, transmitting the steam and gases successively produced in each such retort through the producer to aid in producing gas and supplying the gas to such devices to produce heat therein, the gases produced in the retort being scrubbed to remove and recover ammonia prior to transmission through the producer.

14. In the treatment of garbage and like materials, the process which comprises successively drying and carbonizing the material in a closed receptacle by the aid of externally applied heat, collecting and removing the vapors and gases produced, passing the vapors and gases through a deep bed of ignited fuel comprising carbonized residues from a previous operation, a portion of the gases being scrubbed to remove and recover ammonia prior to passing through said fuel, and returning and burning the gaseous effluent from said fuel to aid in furnishing such heat.

15. In a garbage consuming plant, a removable fire chamber having open flame ports and containing a retort, a stationary regenerative firing device having opposite firing ports adapted to register with said flame ports, a gas producer supplying gas to said firing device and means for transmitting the vapors and gases from said retort to and through the mass of fuel in the gas producer.

16. In a garbage consuming plant, a removable fire chamber having open flame ports and containing a retort, a stationary regenerative firing device having opposite firing ports adapted to register with said flame ports, a gas producer supplying gas to said firing device, stationary gas removing conduit means communicating with the inlet of said producer and means for establishing a temporary connection between said retort and said gas removing means.

17. In a garbage consuming plant, a removable fire chamber having open flame ports and containing a retort, a stationary regenerative firing device having opposite firing ports adapted to register with said flame ports, a gas producer supplying gas to said firing device, stationary gas removing conduit means communicating with the inlet of said producer, scrubbing means for removing and recovering ammonia, means for by-passing gases from and to said conduit means through the scrubbing means, and means for establishing a temporary connection between said retort and said gas removing means.

18. In a garbage consuming plant, a pair of spaced opposite vertical stationary hot-air conduits communicating with a pair of regenerators and having open firing ports, a trackway between said vertical conduits, a plurality of wheel-supported garbage incinerators adapted to move successively along said trackway, each of said incinerators comprising a fire chamber having opposite flame ports adapted to register with said firing ports and provided with a contained retort, a gas producer supplying gas to said firing ports, conduit means transmitting gases and vapors from said retorts to said producer and means for establishing a temporary connection between a retort under treatment and said conduit means.

19. In a garbage incinerator, a transportable open-topped firing chamber having open flame ports adapted to engage with firing ports of a regenerative heating device, an open-topped retort supported within said firing chamber, a closure for the fire chamber and contained retort and means for transmitting a modicum of air to the base of the retort to aid in heating contained matters.

In testimony whereof, I affix my signature in the presence of two subscribing witnesses.

WILLIAM M. CARR.

Witnesses:
 A. B. WOODRUFF,
 HILDA SCHOENTHAL.